United States Patent
Huston

(12) 
(10) Patent No.: US 6,250,173 B1
(45) Date of Patent: Jun. 26, 2001

(54) CRUISE CONTROL FOR A MOTORCYCLE

(76) Inventor: Fred M. Huston, 2841 Saturn St., Unit L, Brea, CA (US) 92621

( * ) Notice: Subject to any disclaimer, the term of this patent is extended or adjusted under 35 U.S.C. 154(b) by 0 days.

(21) Appl. No.: 09/217,146

(22) Filed: Dec. 21, 1998

(51) Int. Cl.$^7$ .............................. B60K 26/02; G05G 1/10; G05G 5/16
(52) U.S. Cl. .................................. 74/489; 74/531
(58) Field of Search .......................... 74/488, 489, 501.6, 74/502, 502.2, 531

(56) References Cited

U.S. PATENT DOCUMENTS

| | | | | |
|---|---|---|---|---|
| 1,185,467 | * | 5/1916 | Beauchamp | 74/488 |
| 1,473,326 | * | 11/1923 | Slawienski | 74/489 |
| 4,137,793 | * | 2/1979 | Sowell | 74/488 |
| 4,364,283 | * | 12/1982 | Ricardo | 74/489 |
| 5,893,295 | * | 4/1999 | Bronnert | 74/488 |

FOREIGN PATENT DOCUMENTS 41 19 275 * 11/1992 (DE) .
41 39 429 * 6/1993 (DE) ..................................... 74/488

* cited by examiner

Primary Examiner—David A. Bucci
Assistant Examiner—William C Joyce
(74) Attorney, Agent, or Firm—John J. Connors; Connors & Assoc.

(57) ABSTRACT

A motorcycle cruise 60 control includes a throttle 12 attached to a handlebar 15 of a motorcycle 14 that controls the motorcycle's speed and an indexer 100 attached to the throttle. The throttle 12 is turned manually using normal torque to increase the speed of the motorcycle, and the indexer 100 has a cruise position and a neutral position. In the cruise position, the indexer 100 holds the throttle 12 in a selected position yet enables the throttle to be turned manually in a stepwise manner. A manual actuator 82 attached to the indexer 100 is used to switch manually the indexer between the cruise position and the neutral position. The throttle 12 with the indexer 100 in the neutral position is turned using essentially the normal torque, and with the indexer in the cruise position is turned using substantially greater than the normal torque.

15 Claims, 10 Drawing Sheets

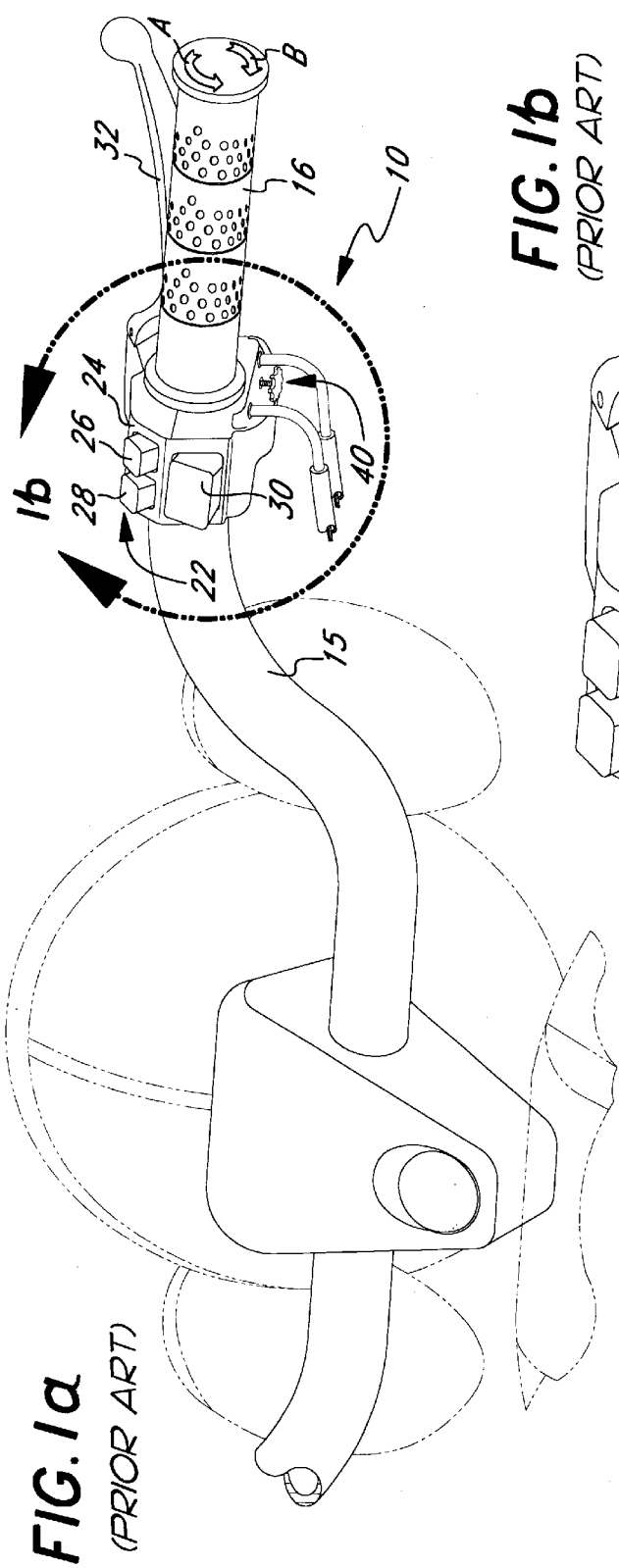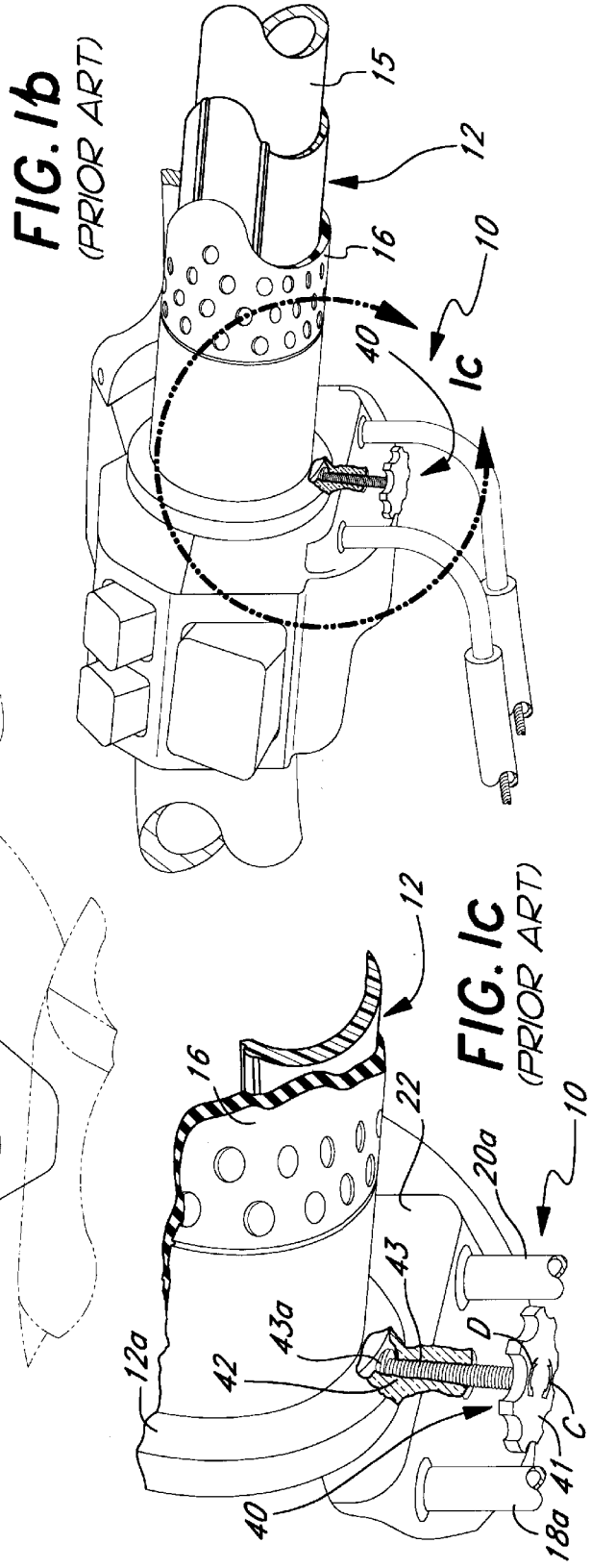
FIG. 1a (PRIOR ART)
FIG. 1b (PRIOR ART)
FIG. 1c (PRIOR ART)

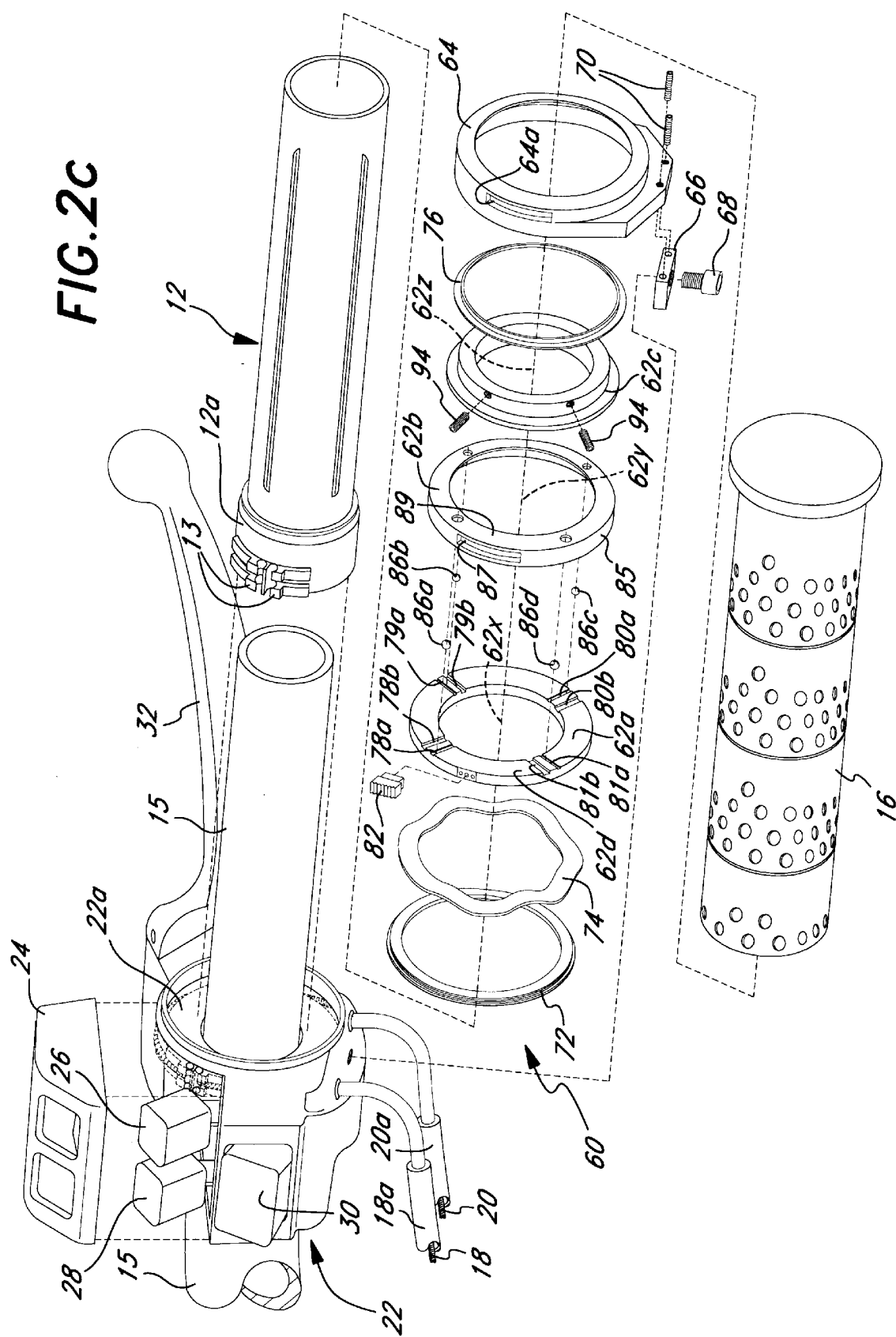

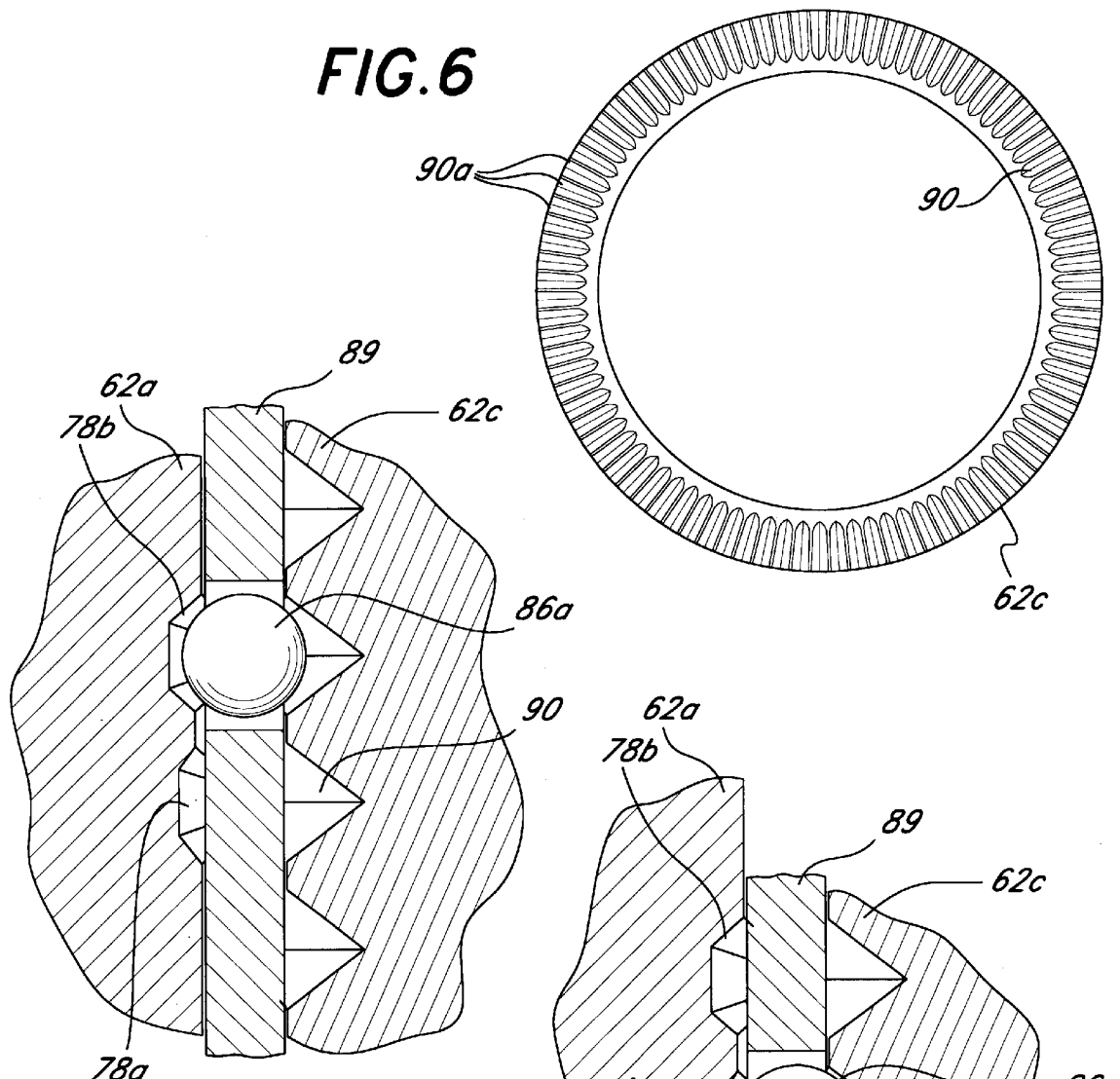

CRUISE CONTROL FOR A MOTORCYCLE

BACKGROUND OF THE INVENTION

1. Field of the Invention

This invention relates to a cruise control for a motorcycle, in particular to such a cruise control which is easily attached to the throttle of a conventional motorcycle and provides a tactile and audio indication to the motorcyclist as he or she changes from one selected cruising speed to another while the cruise controls engaged.

2. Background Discussion

Automobiles frequently employ cruise controls that enable a driver to select the speed of the automobile and maintain this speed without depressing the foot pedal or throttle of the automobile. Attempts have been made to provide cruise controls for motorcycles, but so far, a safe and convenient to use device has not been developed. Conventional motorcycle cruise controls have been either inconvenient to use and, in many instances, are unsafe or unreliable.

SUMMARY OF THE INVENTION

The motorcycle cruise control of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include, but are not limited to, reliable, convenient, and safe setting of a selected speed for the motorcycle while enabling the motorcyclist to change speed without disengaging the cruise control.

The first feature of the motorcycle cruise control of this invention is that the throttle member for controlling the motorcycle's speed is turned manually using a normal torque to increase the speed of the motorcycle when the cruise control is in a neutral position and is turned using a substantially greater than normal torque when the cruise control is in a cruise position.

The second feature is that an indexer is manually moveable between the cruise position and the neutral position. The indexer in the cruise position holds the throttle member in a selected position yet enables the throttle member to be turned manually in a stepwise manner. The indexer includes a plurality of pressure plates or members mounted to the throttle member that engage each other at a first pressure when the indexer is in the neutral position and at a second pressure when the indexer is in the cruise position which is substantially greater than the first pressure. A pair of the pressure members forms a detent assembly that provides a tactile and audible indication as the throttle member is turned. The detent assembly enables the throttle member to be turned manually in a stepwise manner without disengaging the cruise control of this invention.

The third feature is that the pressure members are concentrically aligned with each other and mounted on the throttle member so that the throttle member extends through the central openings of the aligned pressure members. A spring member applies pressure to the pressure members so that the pressure members engage each other at the first pressure when the indexer is in the neutral position to enable the throttle member be turned manually using essentially the normal torque and at the second pressure when the indexer is in the cruise position which is substantially greater than the first pressure to hold the throttle member in a selected position yet enabling the throttle member be turned manually using substantially greater than the normal torque. One of the pressure members has a series of teeth and the detent assembly includes a ball member that engages the teeth one tooth at a time as the throttle is turned, providing stepwise movement of the throttle member.

The fourth feature is a housing adapted to be attached in a fixed position to the handlebar of the motorcycle. Preferably, the housing is removeably attached to the handlebar, and it at least partially encloses the pressure members, which comprise an engagement ring, a ball member retainer ring, and a detent ring. At least one ball member is seated between the engagement ring and the ball member retainer ring, and at least partially extends through the ball member retainer ring to contact the detent ring.

The fifth feature is that the engagement ring, ball member retainer ring, and detent ring are concentricity aligned within the housing. Upon attaching the housing to the handlebar, the throttle member extends through the rings. The engagement ring is seated on the throttle member to turn relative to the throttle member. Preferably, the ball member retainer ring is sized so that the engagement ring is disposed therein. The ball member retainer ring is in a fixed position between the engagement ring and the detent ring, and the detent ring is adapted to be fixedly attached to the throttle member upon attaching the housing to the handlebar. Thus, the detent ring moves in unison with the throttle member. A spring member brings the ball member, engagement ring, ball member retainer ring, and detent ring into engagement with each other.

The sixth feature is an actuator member extending outward from the engagement ring and the housing for manually turning the engagement ring to change from a neutral position to a cruise position. The actuator member is attached to a peripheral edge portion of the engagement ring. There is at least one pair of grooves in one face of the engagement ring. One groove is a deep groove corresponding to the neutral position and the other groove is a shallow groove corresponding to the cruise position. The ball member is normally seated within one of the deep grooves when in the neutral position and is moveable to the shallow groove with rotation of the engagement ring. The ball member retainer ring has at least one opening therein that receives at least a portion of the ball member to hold the ball member so that, with the rotation of the engagement ring, the ball member moves between the grooves. The ball member retainer ring has a peripheral lip portion with a passageway therein that receives the actuator member and exposes the actuator member for manual manipulation. Thus, the engagement ring may be manually rotated clockwise and counterclockwise. A circumferiential flange portion with at least one opening therein receives at least a portion of the ball member. Consequently, with the rotation of the engagement ring between the neutral position and the cruise position, the ball member moves from the deep groove to the shallow groove.

The seventh feature is that the detent ring has a series of teeth that engage a portion of the ball member. There is a lesser force of engagement between the ball member and teeth when the ball member is in the deep groove, so that essentially a normal torque repositions the throttle member. And there is a greater force of engagement between the ball member and teeth when the ball member is in the shallow groove, so that a substantially greater than normal torque repositions the throttle member and the throttle member remains in a selected cruise position until manually repositioned using such greater torque.

DESCRIPTION OF THE DRAWING

The preferred embodiment of this invention, illustrating all its features, will now be discussed in detail. This embodiment depicts the novel and non-obvious motorcycle cruise control of this invention as shown in the accompanying drawing, which is for illustrative purposes only. This drawing includes the following figures (FIGS.), with like numerals indicating like parts:

FIG. 1a is a perspective view showing one type of conventional cruise control for a motorcycle mounted at the end of the motorcycle's handlebar and attached to the throttle of the motorcycle.

FIG. 1b is an enlarged, fragmentary perspective view taken along line 1b of FIG. 1a.

FIG. 1c is an enlarged, fragmentary perspective view of the cruise control shown in FIGS. 1a and 1b taken along line 1c of FIG. 1b.

FIG. 2b is an enlarged, fragmentary perspective view taken along line 2b of FIG. 2a.

FIG. 2c is an exploded perspective view of the cruise control of this invention.

FIG. 3b is an enlarged, fragmentary perspective view taken along line 3b of FIG. 3a.

FIG. 5 is a cross-sectional view taken along line 5—5 of FIG. 2a.

FIG. 6 is a front elevational view of the detent ring used in the cruise control of this invention.

FIG. 7 is an enlarged, fragmentary cross-sectional view showing a ball member seated in a deep groove of the engagement ring.

FIG. 8 is an enlarged, fragmentary cross-sectional view similar to that shown in FIG. 7 showing a ball member seated in a shallow groove of the engagement ring.

THE PRIOR ART

Figure 1D:
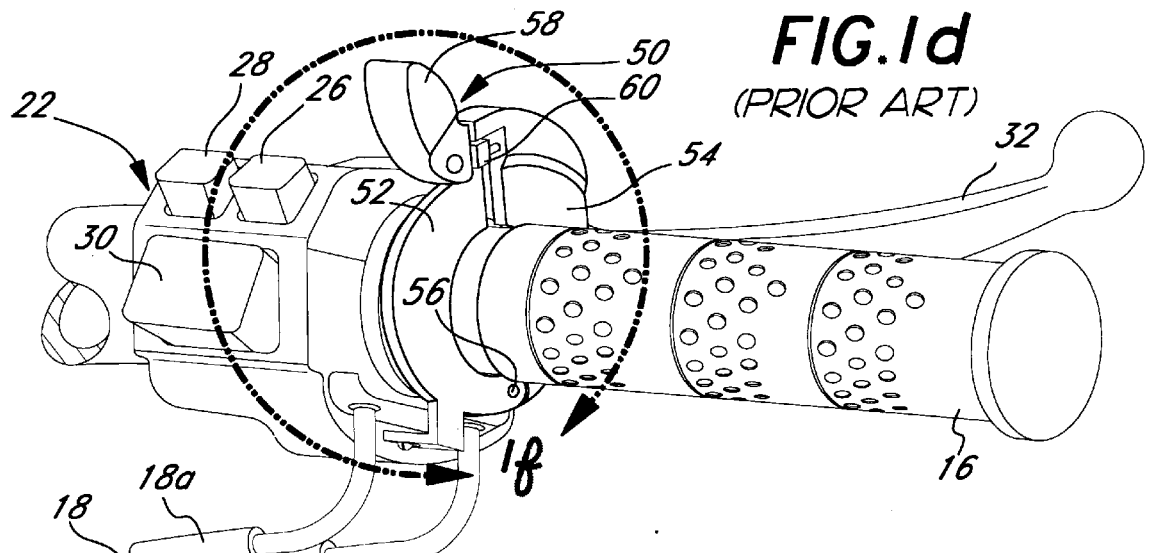
FIG. 1d is a perspective view of a second type of conventional cruise control for a motorcycle mounted at the end of the motorcycle's handlebar and attached to the throttle of the motorcycle.

As illustrated in FIGS. 1a through 1c, one type of prior art device 10, which is sometimes used as a cruise control, is shown attached to the throttle 12 of a motorcycle 14 that is mounted on the end of the motorcycle's handlebar 15. In fact, this device 10 is not recommended by the manufacturer to be used as a cruise control. The manufacturer only recommends that it to be used only during warm-up while motorcycle's gears are in neutral and the throttle 12 is in an idle position as shown in FIG. 1a. Nevertheless, many motorcyclist use it, or attempt to use it, as a cruise control.

In accordance with conventional practice, the throttle 12, which has a grip 16 covering its exterior surface, is connected through a push cable 18 and pull cable 20 to the fuel feeding system (not shown) of the motorcycle 14. These cables 18 and 20 are received, respectively, within cable housings 18a and 20a that extend outward from a switch housing 22 that has a cap 24 covering a kill switch 26 to shut the motorcycle's engine off, a starter switch 28, and a turn signal switch 30. As is conventional, a brake lever 32 is next to the switch housing 22 to enable the motorcyclist to release the throttle 12 and engage the motorcycle's brake (not shown) simultaneously by pressing the brake lever inward toward the throttle. The cables 18 and 20 are attached to the proximal end 12a of the throttle 12 by cable connectors 13, so that as the throttle is turned, these cables are actuated to increase or decrease the flow of fuel to the motorcycle's engine (not shown), depending on the direction of rotation of the throttle. The throttle 12 is designed so that when the motorcyclist releases his or her grasp, it automatically returns to the idle position, as shown in FIG. 1a. When the motorcyclist grasps the throttle 12, in this embodiment with his or her right hand and turns the throttle counterclockwise, as indicated by the arrow A, the push cable 18 and pull cable 20 are actuated to increase the flow of fuel, increasing the motorcycle's speed. When the motorcyclist releases his or her grasp of the throttle 12, the throttle automatically turns or rotates in a clockwise direction, as indicated by the arrow B, to return to the idle position.

As best shown in FIG. 1c, the device 10 comprises a simple thumbscrew 40 having a head 41 and shaft 43 extending therefrom which is received in a threaded portion 42 of the switch housing 22. This thumbscrew 40, when it is turned in the direction indicated by the arrow C in FIG. 1c, brings the distal end 43a of the shaft 43 into engagement with the proximal end 12a of the throttle 12. This thumbscrew 40 is turned manually after the motorcyclist has turned the throttle 12 counterclockwise to reach a selected speed. Typically, the motorcyclist uses his or her thumb to press against the head 41 and turn the thumbscrew 40 while simultaneously holding the throttle in the position selected by the motorcyclist. In order for the motorcyclist to disengage the device 10, he or she must turn the thumbscrew 40 in the opposite direction indicated by the arrow D, allowing the throttle 12 to return to the idle position or to another position selected by the motorcyclist. This type of thumbscrew device 10 is very dangerous because it can become frozen, or otherwise locked into position, holding the throttle 12 in a position to cause fuel to be fed to the motorcycle's engine when the throttle should be released to enable the motorcyclist to slow down the speed of the motorcycle or stop. This type of thumbscrew device 10 also may come loose due to the vibration of the motorcycle, resulting in the throttle 12 returning to its idle position unless grasped by the motorcyclist.

Figure 1E:
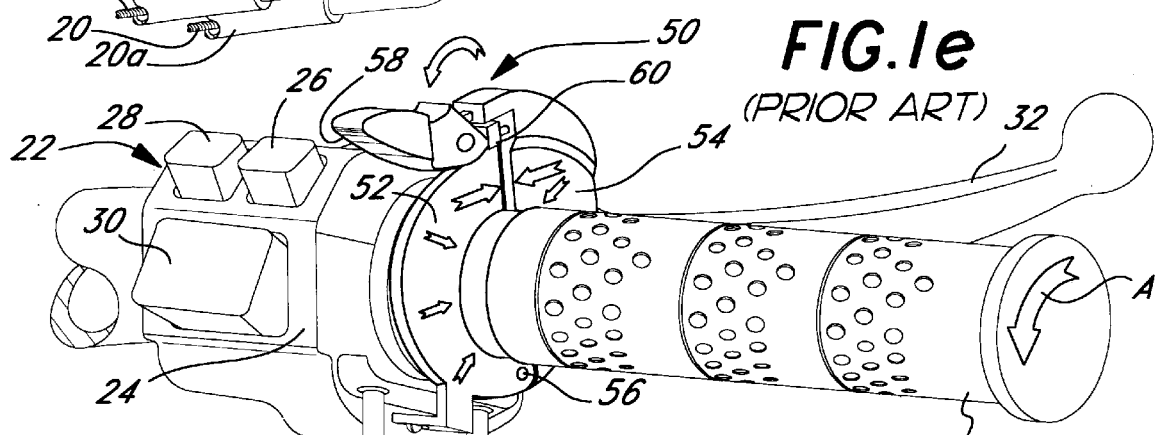
FIG. 1e is a perspective view similar to that shown in FIG. 1d, showing the second type of prior art cruise control in a closed position to hold the throttle at a selected speed.
Figure 1F:
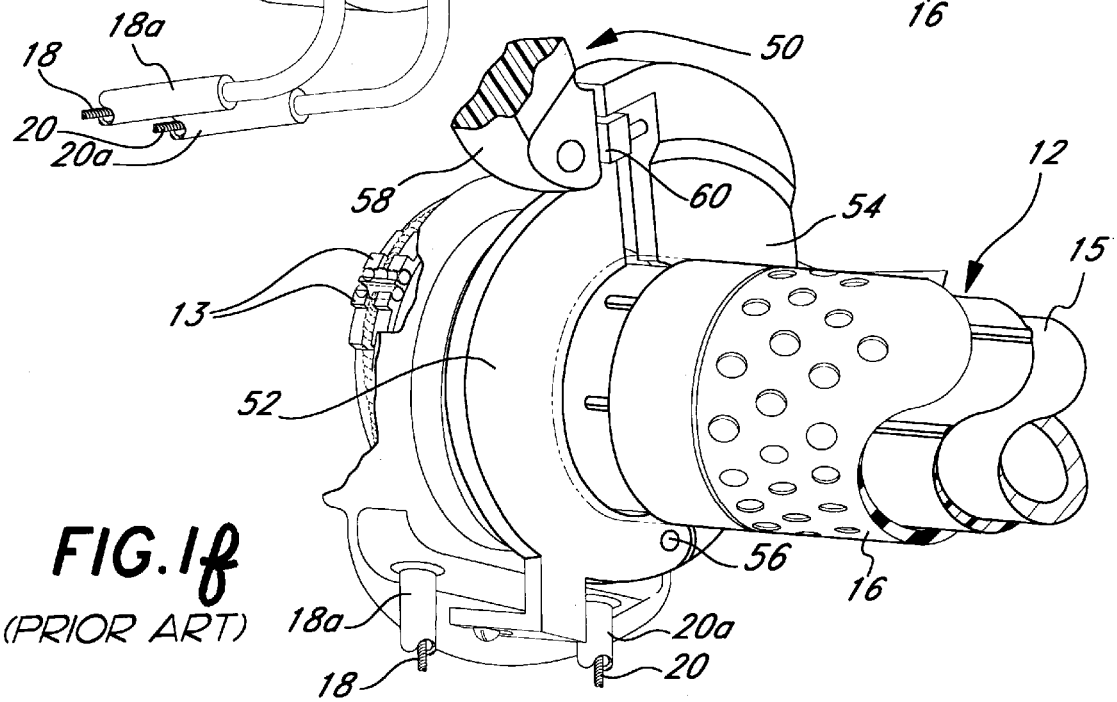
FIG. 1f is an enlarged, fragmentary perspective view taken along line 1f of FIG. 1d.

As shown in FIGS. 1d through 1f, a second type of cruise control 50 is provided, which includes a pair semi-annular sections 52 and 54 that are hinged together at one end 56 to pivot and an open/close lever 58 attached to the other end 60. When the open/close lever 58 is in the up position, as shown in FIGS. 1d and 1f, the pair of semi-annular sections 52 and 54 are in an open position so that the throttle 12 can be freely turned by the motorcyclist to either increase or decrease the speed of the motorcycle. When the motorcyclist selects the desired cruising speed, he or she then depresses the open/close lever 58, moving it the position shown in FIG. 1e, to bring the two semi-annular sections 52 and 54 together to engage the proximal end 12a of the throttle 12 and hold it in the selected position. When the motorcyclist desires to disengage this cruise control 50, the he or she simply uses his or her thumb to push the open/close lever 58 to the up position shown in FIG. 1d, enlarging the opening between the semi-annular sections, permitting the throttle 12 to again be turned manually to select a new speed; or, if the motorcyclist's grasp is released, the throttle automatically returns to its idle position. Although this cruise control 50 is safer than the other device 10, it suffers from the disadvantage that the motorcyclist cannot maintain the cruise control activated and alter the motorcycle's speed, either slightly increasing or decreasing it, without disengaging this cruise control. Moreover, this cruise control 50 often "sticks" from the accumulation of contaminates entering the sliding surfaces due to the open design which exposes these surfaces. It is susceptible to vibration and becomes loose or too tight making slight incremental adjustments in speed impossible.

DESCRIPTION OF THE PREFERRED EMBODIMENT OF THIS INVENTION

Figure 4:
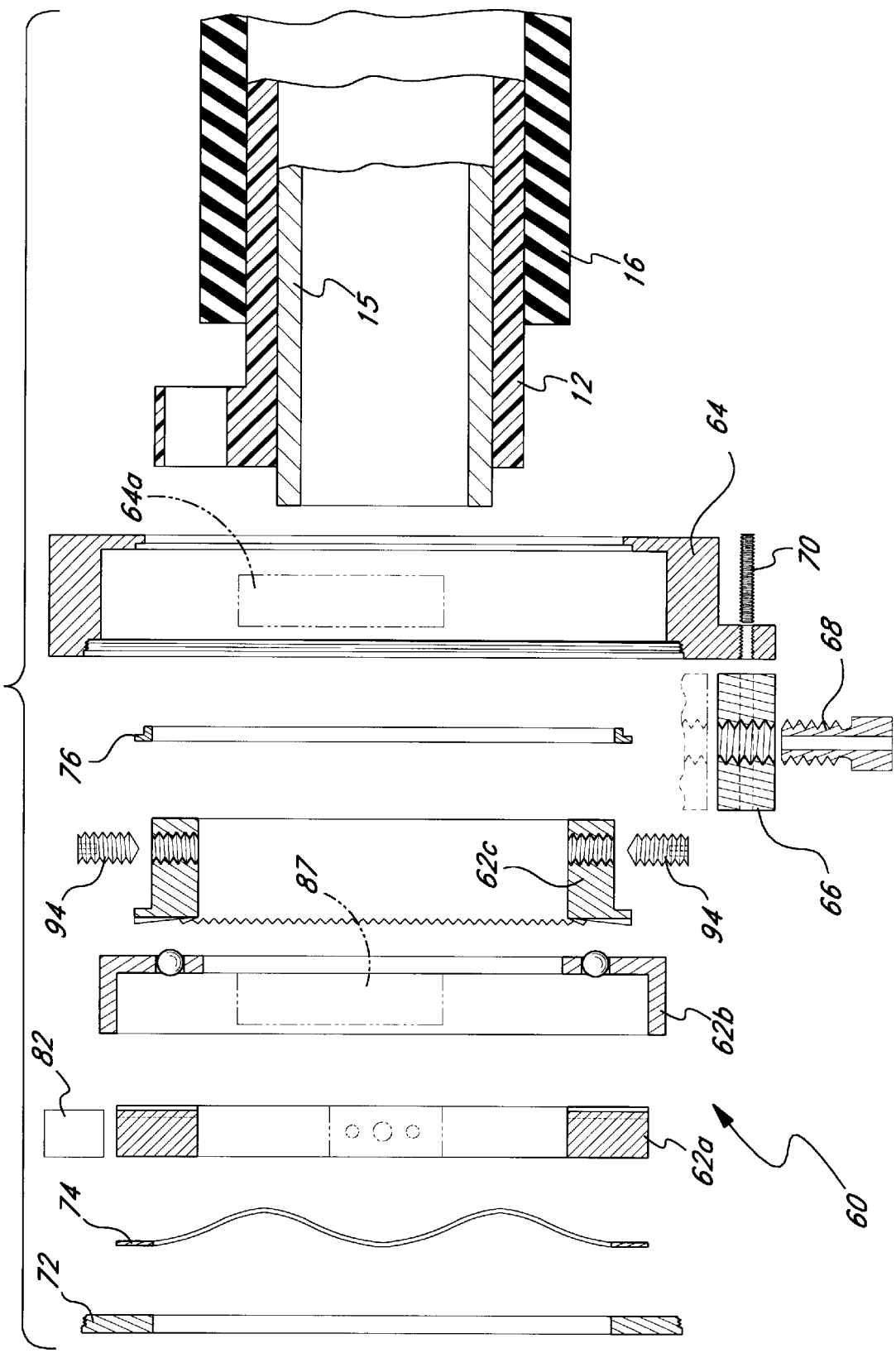
FIG. 4 is a cross-sectional view of the major components of the cruise control of this invention, shown aligned and exploded.
Figure 5:
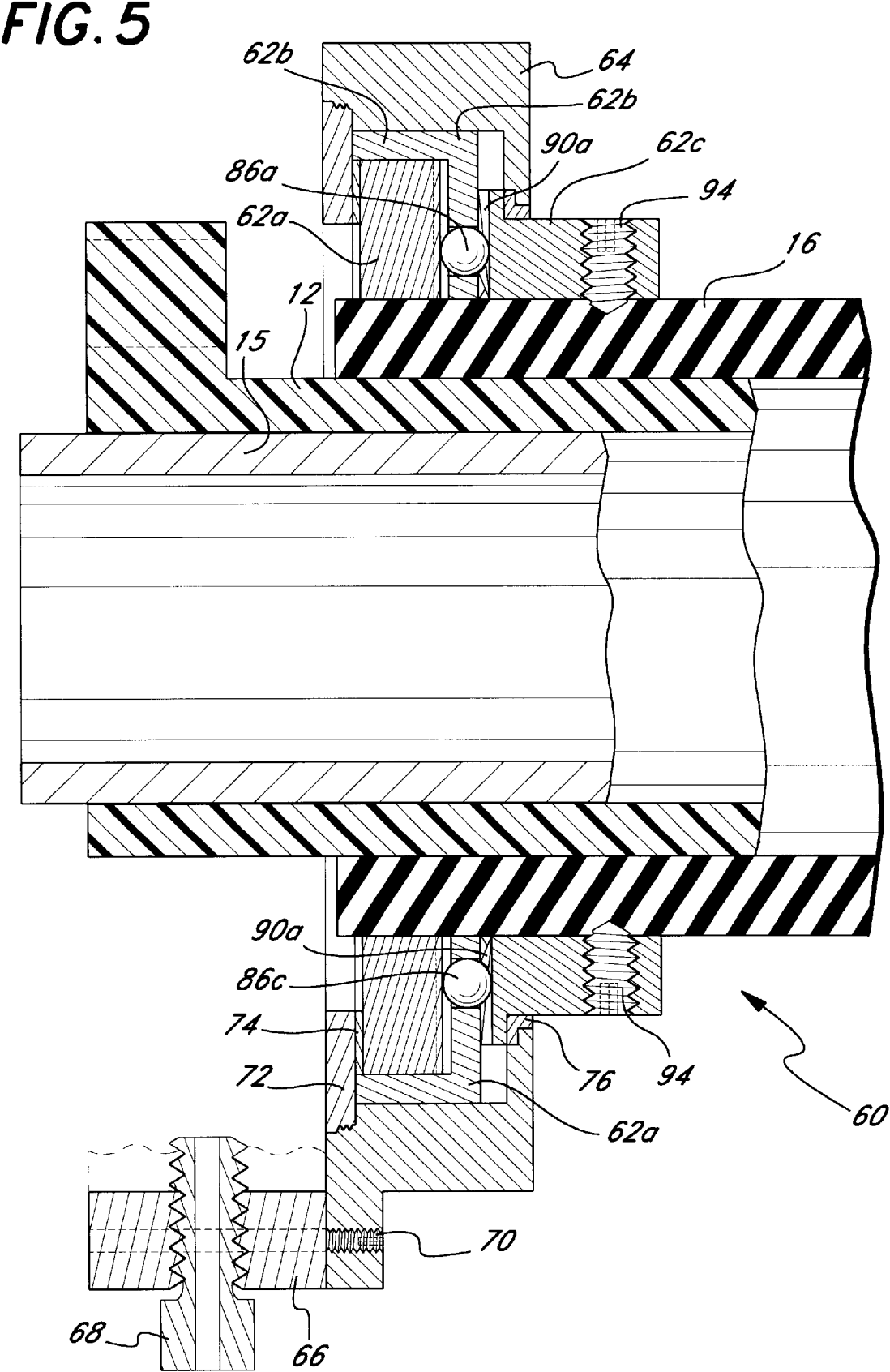

As best shown in FIGS. 2c, 4, and 5, the cruise control 60 of this invention includes a series of pressure rings 62a, 62b, and 62c concentrically aligned and mounted on the throttle 12, which passes through central openings 62x, 62y and 62z, respectively, in these pressure rings. Specifically, the first pressure ring 62a is an engagement ring; the second ring 62b is a ball retainer ring; and the third ring 62c is a detent ring. These rings 62a, 62b, and 62c are enclosed, at least partially, within a housing 64, that is attached to the handlebar 15 indirectly by attachment to the switch housing 22. The housing 64 has a window 64a therein, and a pair of Allen screws 70 secures the housing 64 to a bracket 66 that is removably, but fixedly attached, by a screw 68 to the switch housing 22. Positioned in sequence within this housing 64 are a retainer ring 72, an annular wavy spring 74, the engagement ring 62a, the ball retainer ring 62b, the detent ring 62c, and a bushing 76.

Figure 2A:
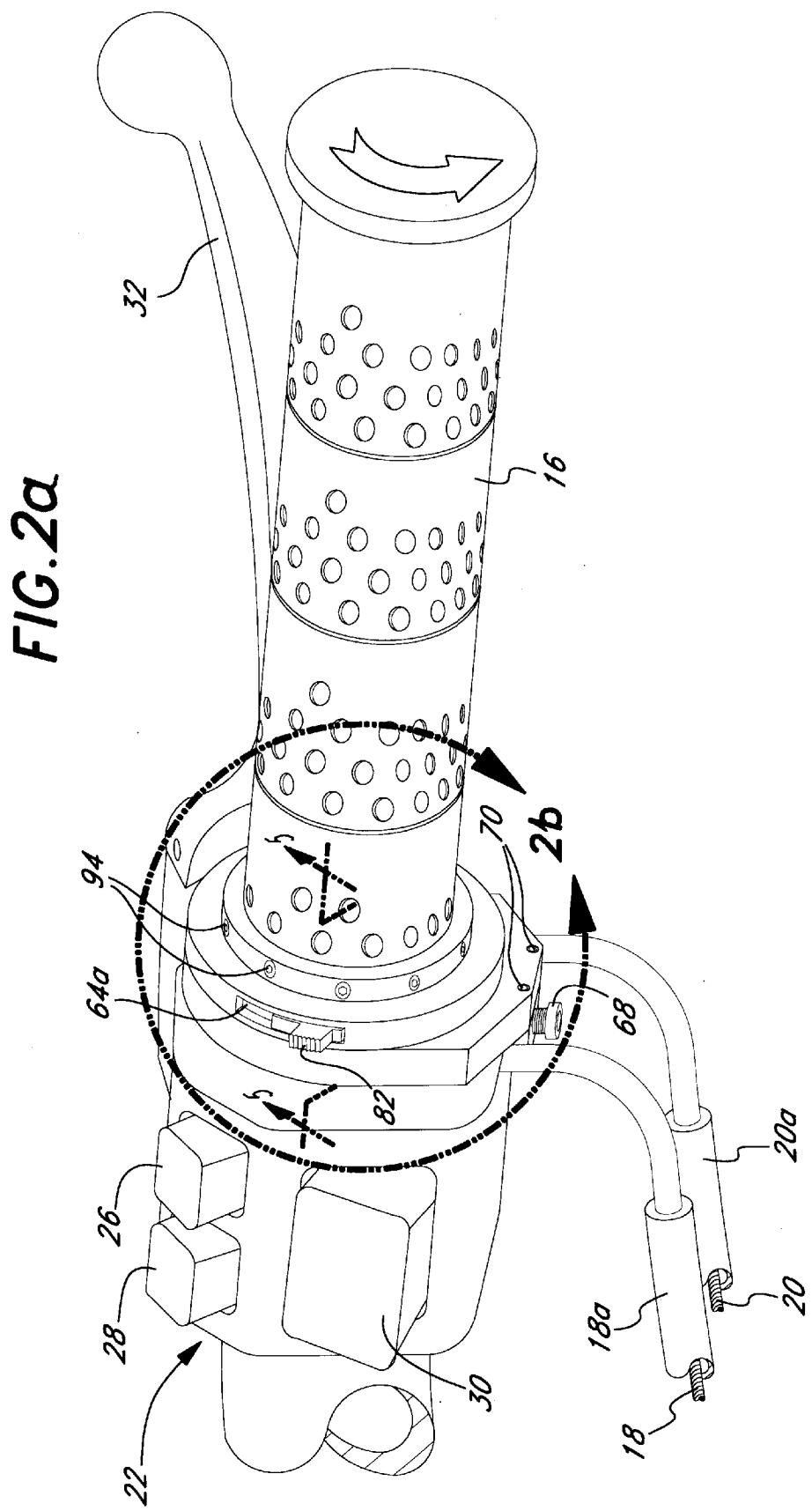
FIG. 2a is a perspective view of the cruise control of this invention mounted at the end of the motorcycle's handlebar and attached to the throttle of the motorcycle.
Figure 2B:
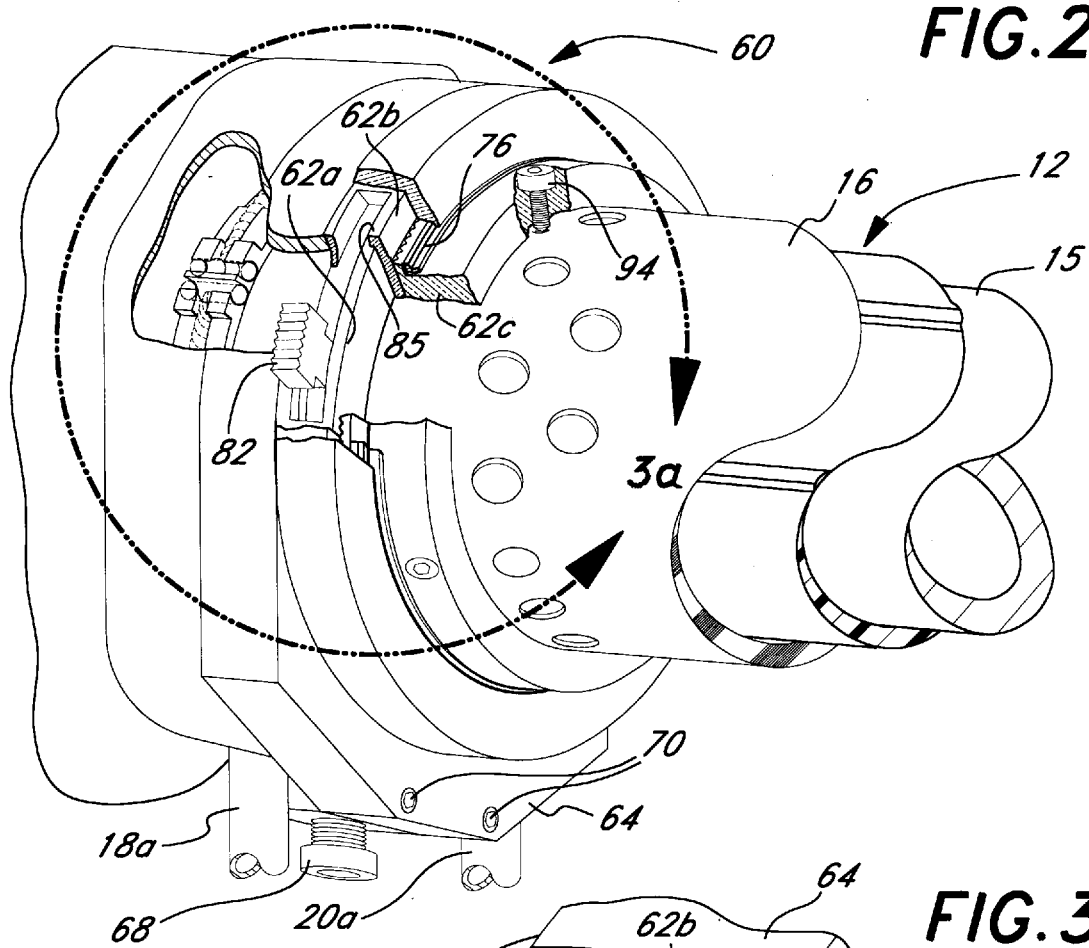
Figure 2D:
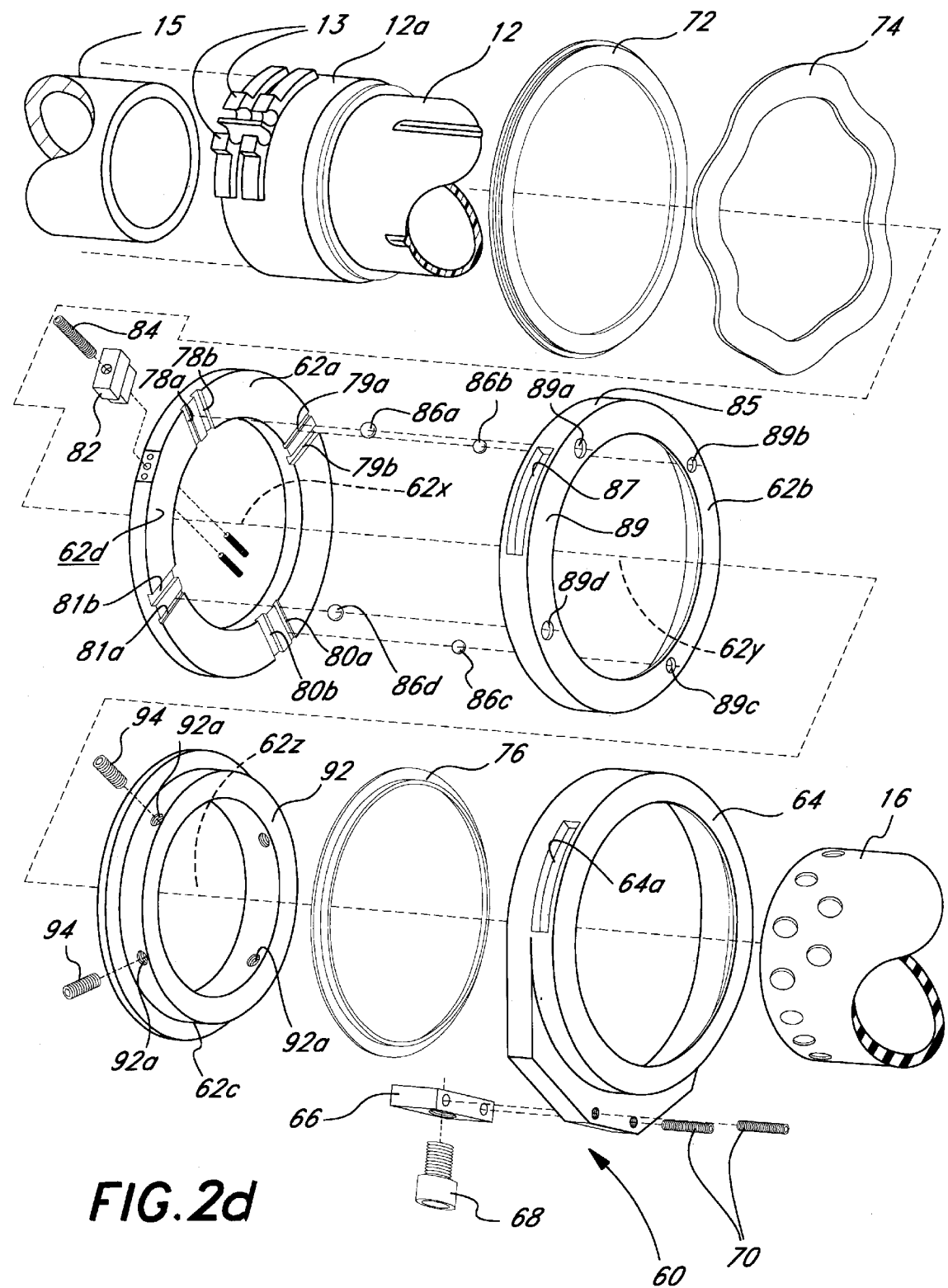
FIG. 2d is another exploded perspective view of the cruise control of this invention, showing its major components and how they are aligned.

As best shown in FIGS. 2c and 2d, the first pressure ring, the engagement ring 62a, has on its front face 62d four pairs of grooves 78a, 78b, 79a, 79b, 80a, 80b, and 81a, 81b. Each pair of grooves 78a, 78b, 79a, 79b, 80a, 80b, and 81a, 81b is spaced apart from each other at approximately 90 degrees, and each pair includes a shallow groove: grooves 78a, 79a, 80a, and 81a, and a deep groove: grooves 78b, 79b, 80b, and 81b. Extending outward from the peripheral edge 63 of this engagement ring 62a is a thumb actuator 82 that is secured by an Allen screw 84 (FIG. 2d) to this peripheral edge. Associated with each pair of grooves 78a, 78b, 79a, 79b, 80a, 80b, and 81a, 81b is a ball member: ball member 86a is associated with grooves 78a, 78b; ball member 86b is associated with grooves 79a, 79b; ball member 86c is associated with grooves 80a, 80b; and ball member 86d is associated with grooves 81a, 81b. As will be explained in greater detail subsequently, each ball member associated with each pair of grooves moves from one groove to the other within a pair of grooves, depending on whether the cruise control is in a neutral position shown in solid lines in FIG. 3a or a cruise position shown in dotted lines in FIG. 3a.

Figure 3B:
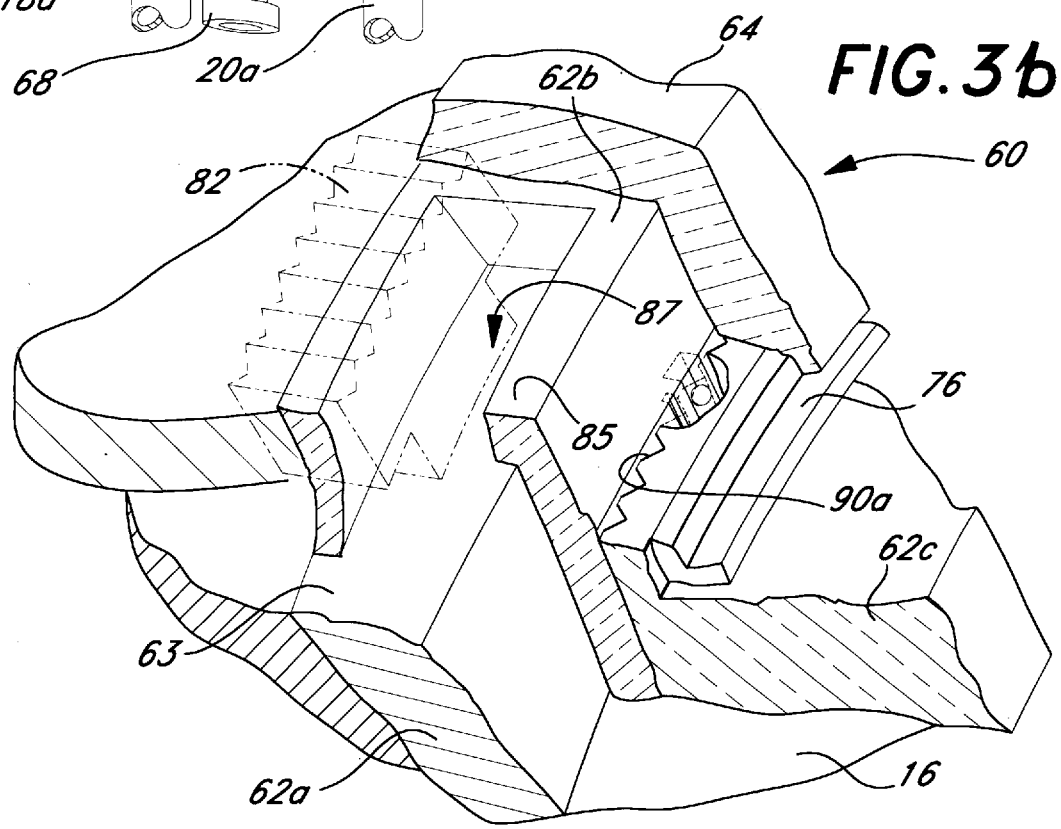

As shown best in FIGS. 2b and 3b, the second pressure ring, the ball retainer ring 62b, has a peripheral lip 85, which has a window 87 therein that serves as a passageway for the thumb actuator 82 when the rings 62a, 62b, and 62c are assembled within the housing 64. The ball retainer ring 62b also has a circumferential flange 89 with four holes 89a, 89b, 89c, and 89d therein, spaced apart at approximately 90 degrees. The flange 89 interfaces with the inner surface 90 of the third pressure ring, the detent ring 62c. This inner surface 90 of the detent ring 62c has a series of teeth 90a (FIG. 6) therein. As best shown in FIGS. 3B, 4, and 5, upon assembly of the engagement ring 62a, ball retainer ring 62b, and detent ring 62c, a portion of each ball member 86a, 86b, 86c, and 86d, extends respectively through each of the holes 89a, 89b, 89c, and 89d in the ball retainer ring 62b and engages the teeth 90a in the inner surface 90 of the detent ring 62c. The engagement ring 62a has a slightly smaller diameter than the inside diameter of the ball retainer ring 62b. Thus, upon assembly, the engagement ring 62a is received within the ball retainer ring 62b and the window 87 of the ball retainer ring is in registration with the window 64a in the housing 64. The detent ring 62a has an outwardly extending rim 92 with threaded openings 92a therein for Allen screws 94 that secure the detent ring 62a in a fixed position to the grip 16. The grip 16 fits snugly around the exterior of the throttle 12, so that the detent ring 62a moves in unison with the turning of the throttle.

To assemble the components of the cruise control 60 of this invention, the retainer ring 72 is first slid over the assembly of grip 16 and throttle 12 and is seated on an inside cavity 22a (FIG. 2c) of the switch housing 22. Next the wavy spring 74 is slid over the assembly of the grip 16 and throttle 12 to abut the retainer ring 72. The engagement ring 62a, ball retainer ring 62b, detent ring 62c, and ball members 86a, 86b, 86c, and 86d are then assembled to form an indexer subassembly 100 (FIG. 3a), with the thumb actuator 82 extending through the window 87 in the ball retainer ring 62b. The ball members 86a, 86b, 86c, and 86d are each positioned in one deep groove, 81a, 81b, 81c, and 81d, respectively in the engagement ring 64a. A portion of each of these ball members 86a, 86b, 86c, and 86d extends respectively through the openings 89a, 89b, 89c, and 89d in the circumferential flange 89 of the ball retainer ring 62b to engage the teeth of the detent ring 62c. The indexer subassembly 100 is then slid over the assembly of grip 16 and throttle 12, and the detent ring 62c is secured to the grip 16 by screwing the Allen screws 94 through the rim 92 and into the grip. Next, the bushing 76 is placed over the rim 92 of the detent ring 62c, and the housing 64, with the bracket 66 attached thereto by the Allen screws 70, is slid over the indexer subassembly 100, with the actuator 82 passing through the window 64a in the housing. Finally, the housing 64 is secured to the switch housing 22 by the screw 68 being threaded through the bracket 66. Upon assembly, the housing 64 substantially encloses the other components of the cruise control 60, thereby preventing dirt from interfering with the operation of the cruise control.

Figure 3A:
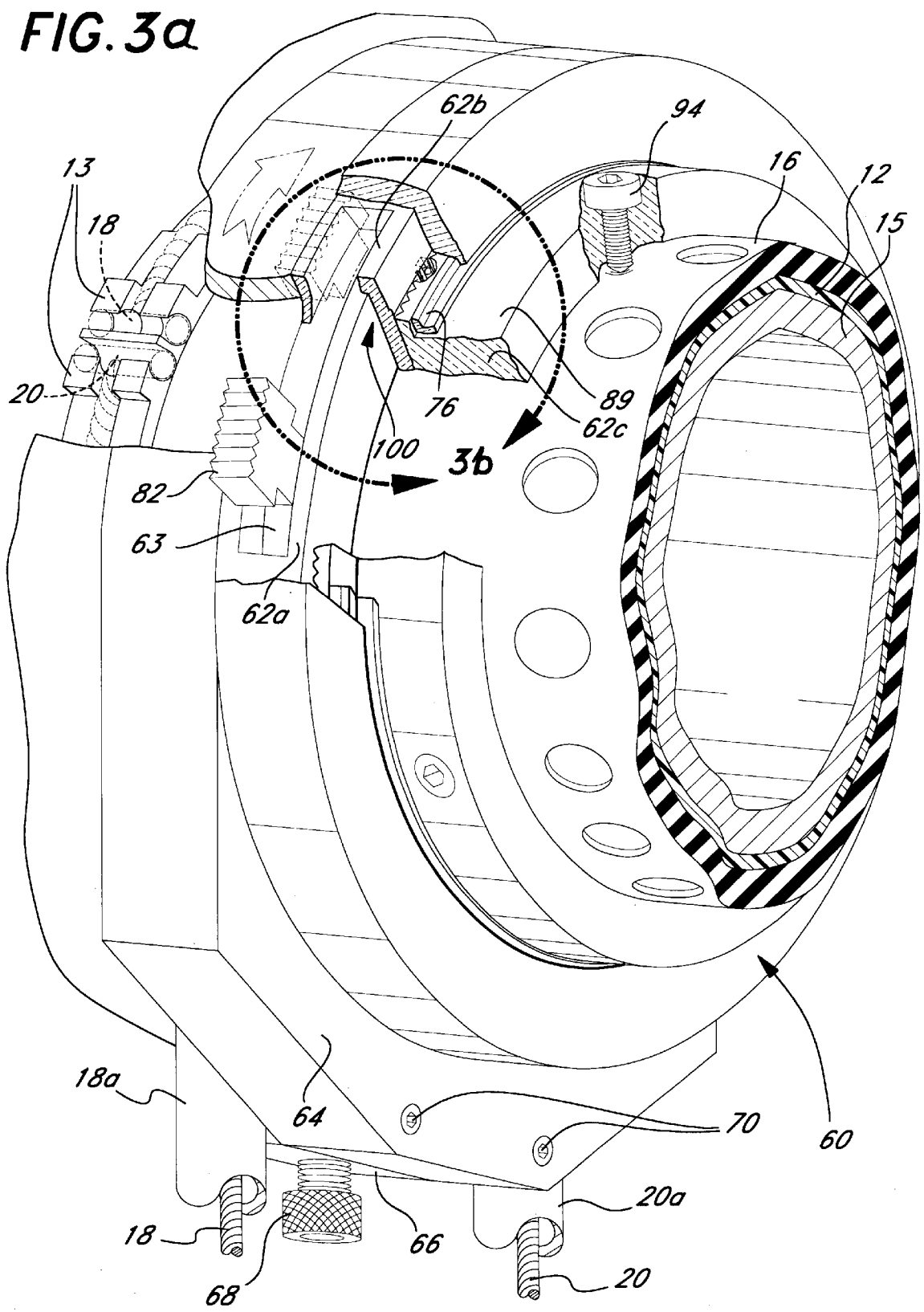
FIG. 3a is an enlarged, fragmentary perspective view of the cruise control of this invention, showing it attached to the throttle with sections broken away.

In operation, the thumb actuator 82 is normally in the neutral position shown in solid lines in FIG. 3a, with the ball members 86a, 86b, 86c, and 86d seated in the deep grooves 78b, 79b, 80b, and 81b. The ball members 86a, 86b, 86c, and 86d, with the cruise control 60 in the neutral position, contact the teeth 90a of the detent ring 62c. With the ball members 86a, 86b, 86c, and 86d in the deep grooves 78b, 79b, 80b, and 81b, the wavy spring 74 bears against the subassembly of engagement ring 62a, ball retainer ring 62b, and detent ring 62c to produce a reduced pressure between the ball members and the teeth 90a of the detent ring 62. Consequently, the torque that the motorcyclist uses to turn the throttle 12 with the cruise control 60 in the neutral position is essentially the same as the torque normally used to turn the throttle without employing any type of cruise control. The motorcyclist may now manipulate the throttle 12 in a conventional manner, and he or she will only feel a slight tactile sensation as the ball members 86a, 86b, 86c, and 86d engage individual teeth 90a, moving from one tooth to the next, as the detent ring 62c turns in unison with the throttle 12. A clicking noise also occurs as the ball members 86a, 86b, 86c, and 86d move from one tooth to the other. With each indexing step, that is, moving one tooth at a time, the speed is either increased or decreased by about 1½–2 miles per hour depending on the direction the throttle is turned, either clockwise of counterclockwise as view in FIG. 2a.

When the motorcyclist has selected a desired cruising speed by turning the throttle 12 counterclockwise as view in FIG. 2a, he or she simply pushes the thumb lever 82 upward to the dotted position shown in FIG. 3a. This causes the engagement ring 62a to move in a clockwise direction as shown in FIGS. 2b and 3a. The ball members 86a, 86b, 86c, and 86d, seated in the holes 89a, 89b, 89c, and 89d of the ball retainer ring 62b, which is in a fixed, stationary position relative to the throttle 12, are forced by the movement of the engagement ring 62a to move from the deep grooves 78b, 79b, 80b, and 81b (FIG. 7) to the shallow grooves 78a, 79a, 80a, and 81a (FIG. 8). The wavy spring 74 now bears against the subassembly of engagement ring 62a, ball retainer ring 62b, and detent ring 62c to produce an increased pressure between the ball members 86a, 86b, 86c, and 86d and the teeth 90a of the detent ring 62 that is substantially greater than the pressure applied when these ball members are in the deep grooves 78b, 79b, 80b, and 81b. This increase in pressure holds the throttle 12 in the position selected by the motorcyclist without requiring the motorcyclist to apply any holding torque to the throttle. In other words, the motorcyclist may release his or her grasp of the throttle 12, and the throttle will be held by the cruise control 60 in the position selected without returning to the throttle to its idle position. Nevertheless, the motorcyclist may still turn the throttle 12, because the ball members seated in the ball retainer ring 62b and detent ring 62b allow the throttle to be indexed, namely, turned either in a clockwise or counterclockwise direction one tooth at a time to either increase or decrease the speed. With each indexing step, as controlled by the teeth 90a in the detent ring 62c, the throttle 12 moves one tooth (or indexing step) at a time and is held in the newly selected step position for as long as the cruise control 60 is in the cruise position.

To release the cruise control 60, the motorcyclist simply depresses the thumb actuator 82, moving it from the up position (dotted lines) to the down position (solid lines) as shown in FIG. 3a. The motorcyclist now uses normal torque to hold the throttle 12, and upon releasing his or her grasp of the throttle, the throttle automatically returns to its idle position. The manner in which the thumb actuator 82 is manipulated, plus the use of the detent assembly of ball members 86a, 86b, 86c, and 86d, engagement ring 62a, and ball retainer ring 62a, and detent ring 62c, assures the safe release of the cruise control 60, avoiding freezing in the cruise position. The motorcyclist may now, with confidence and safety, control the speed of his or her motorcycle in a manner similar to that commonly experienced by motorists. Fuel conservation is frequently achieved using this cruise control 60.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A cruise control for a motorcycle having a throttle member for controlling the motorcycle's speed attached to a handlebar of the motorcycle and adapted to be turned manually using a normal torque to increase the speed of the motorcycle, said cruise control including
    a housing adapted to be attached in a fixed position to the handlebar of the motorcycle,
    said housing at least partially enclosing at least one ball member, an engagement ring, a ball member retainer ring, and a detent ring,
    said engagement ring, ball member retainer ring, and detent ring being concentricity aligned within the housing so that, upon attaching the housing to the handlebar, the throttle member extends through the rings and the engagement ring is seated on the throttle member to turn relative to the throttle member,
    said ball member retainer ring being in a fixed position between the engagement ring and the detent ring, and said detent ring being adapted to be fixedly attached to the throttle member upon attaching the housing to the handlebar, so that said detent ring moves in unison with the throttle member,
    a spring member that brings said ball member, engagement ring, ball member retainer ring, and detent ring into engagement with each other,
    an actuator member extending outward from said engagement ring and the housing for manually turning said engagement ring,
    at least one pair of grooves in said engagement ring, one groove being a deep groove corresponding to a neutral position and the other groove being a shallow groove corresponding to a cruise position, said ball member being seated within one of said grooves and moveable between said grooves with rotation of the engagement ring,
    said ball member retainer ring having at least one opening therein that receives at least a portion of the ball member to hold the ball member so that, with the rotation of the engagement ring, the ball member moves between the grooves,
    said detent ring having a series of teeth which engage a portion of the ball member, there being a lesser force of engagement between said ball member and teeth when the ball member is in the deep groove, so that essentially a normal torque repositions the throttle member, and there being a greater force of engagement between said ball member and teeth when the ball member is in the shallow groove, so that a substantially greater than normal torque repositions the throttle member and the throttle member remains in a selected position until manually repositioned using such greater torque.

2. The cruise control of claim 1 where the housing is removeably attached to the handlebar.

3. The cruise control of claim 1 where the ball member retainer ring is sized so that the engagement ring is disposed therein.

4. The cruise control of claim 1 where the engagement ring has a peripheral edge portion to which the actuator member is attached.

5. The cruise control of claim 1 where the engagement ring has a face portion in which the grooves are disposed.

6. The cruise control of claim 1 where the detent ring enables the throttle member to be turned in a stepwise manner one tooth at a time as the detent ring is turned in unison with the throttle member.

7. The cruise control of claim 1 where the ball member retainer ring has a peripheral lip portion with a passageway therein that receives the actuator member and exposes the actuator member for manual manipulation to enable the engagement ring to be manually rotated clockwise and counterclockwise and a circumferiential flange portion with at least one opening therein that receives at least a portion of the ball member so that, with the rotation of the engagement ring between the neutral position and the cruise position, the ball member moves from the deep groove to the shallow groove.

8. The motorcycle cruise control of claim 1 where said throttle member with the indexer in the neutral position being turned using essentially the normal torque, and said throttle member with the indexer in the cruise position being turned using substantially greater than the normal torque.

9. A motorcycle cruise control including a throttle member attached to a handlebar of the motorcycle that controls the motorcycle's speed, said throttle member being turned manually using a normal torque to increase the speed of the motorcycle, and an indexer that is manually moveable between a cruise position and a neutral position, said indexer in the cruise position holding the throttle member in a selected position yet enabling the throttle member to be turned manually without disengaging the cruise control, said indexer including a pair of pressure members, one of said pressure members having one pair of grooves therein, one groove being a deep groove corresponding to a neutral position and the other groove being a shallow groove corresponding to a cruise position, a moveable member seated within one of said grooves and moveable between said grooves with rotation of one of the pressure members.

10. A motorcycle cruise control, including a throttle member attached to a handlebar of the motorcycle that controls the motorcycle's speed and is adapted to be turned manually using a normal torque to increase the speed of the motorcycle, and an indexer attached to the throttle member that is manually moveable between a cruise position and a neutral position, said indexer including a plurality of pressure members mounted to the throttle member which engage each other at a first pressure when the indexer is in the neutral position and at a second pressure when the indexer is in the cruise position which is substantially greater than said first pressure, one of said pressure members having one pair of grooves therein, one groove being a deep groove corresponding to a neutral position and the other groove being a shallow groove corresponding to a cruise position, a moveable member seated within one of said grooves and moveable between said grooves with rotation of one of the pressure members, said pressure members with the indexer in the neutral position enabling the throttle member be turned manually using essentially the normal torque and said pressure members with the indexer in the cruise position holding the throttle member in a selected position yet enabling the throttle member be turned manually using substantially greater than the normal torque.

11. The motorcycle cruise control of claim 10 where a pair of said pressure members form a detent assembly that provides a tactile and audible indication as the throttle member is turned.

12. The motorcycle cruise control of claim 10 where the detent assembly enables the throttle member to be turned manually in a stepwise manner.

13. A cruise control for a motorcycle, including a throttle member for controlling the motorcycle's speed attached to a handlebar of the motorcycle and adapted to be turned manually using a normal torque to increase the speed of the motorcycle, an indexer attached to the throttle member that is manually moveable between a cruise position and a neutral position, said indexer including a detent assembly enabling the throttle member to be turned manually in a stepwise manner, said detent assembly including a plurality of pressure members with each pressure member having a central opening therein, said pressure members being concentrically aligned with each other and mounted on the throttle member so that said throttle member extends through the central openings of the aligned pressure members, and a spring member which applies pressure to the pressure members so that said pressure members engage each other at a first pressure when the indexer is in the neutral position to enable the throttle member be turned manually using essentially the normal torque and at a second pressure when the indexer is in the cruise position which is substantially greater than said first pressure to hold the throttle member in a selected position yet enabling the throttle member be turned manually using substantially greater than the normal torque.

14. The motorcycle cruise control of claim 13 where one of the pressure members has a series of teeth and the detent assembly includes a ball member that engages the teeth one tooth at a time as the throttle is turned, providing stepwise movement of the throttle member.

15. The motorcycle cruise control of claim 14 where the detent assembly provides a tactile and audible indication as the throttle member is turned.

* * * * *